US 6,540,496 B1

(12) United States Patent
Schad et al.

(10) Patent No.: US 6,540,496 B1
(45) Date of Patent: *Apr. 1, 2003

(54) SHOOTING POT ACTUATOR FOR AN INJECTION MOLDING MACHINE

(75) Inventors: Robert Schad, Toronto (CA); Robert Sicilia, Mississauga (CA); Ronald Ing, Etobicoke (CA); Bruce Catoen, Georgetown (CA); Robert Domodossola, Mississauga (CA)

(73) Assignee: Husky Injection Molding Systems Ltd., Bolton (CA)

( * ) Notice: Subject to any disclaimer, the term of this patent is extended or adjusted under 35 U.S.C. 154(b) by 66 days.

This patent is subject to a terminal disclaimer.

(21) Appl. No.: 09/605,940

(22) Filed: Jun. 28, 2000

Related U.S. Application Data

(63) Continuation of application No. 09/050,095, filed on Mar. 30, 1998, now Pat. No. 6,152,721.

(51) Int. Cl.7 .............................................. B29C 45/02
(52) U.S. Cl. ........................ 425/150; 425/557; 425/588; 264/328.8
(58) Field of Search ................................. 425/557, 558, 425/559, 560, 561, 130, DIG. 228, 562, 588, 150; 264/297.2, 328.8

(56) References Cited

U.S. PATENT DOCUMENTS

| 3,231,656 A | 1/1966 | Ninneman ............. 264/328.14 |
| 3,516,123 A | 6/1970 | Lang et al. ................. 425/166 |
| 4,347,211 A | 8/1982 | Bandoh ..................... 264/297 |
| 4,460,324 A | 7/1984 | Van Appledorn ........... 425/166 |
| 4,599,062 A | 7/1986 | Konishi ..................... 425/116 |
| 4,632,653 A | 12/1986 | Plocher ..................... 425/149 |
| 4,717,324 A | 1/1988 | Schad et al. ................. 425/130 |
| 4,734,243 A | 3/1988 | Kohama et al. .......... 264/328.8 |
| 4,917,840 A | 4/1990 | Harada et al. ............. 264/40.5 |
| 4,925,161 A | 5/1990 | Allan et al. ................... 264/69 |
| 4,966,545 A | 10/1990 | Brown et al. ............... 425/557 |
| 5,098,274 A | 3/1992 | Krishnakumar et al. . 425/133.1 |
| 5,512,223 A | 4/1996 | Morikita ...................... 264/71 |
| 5,662,856 A | 9/1997 | Wunderlich .............. 264/297.2 |
| 5,736,169 A | 4/1998 | Brams et al. ............. 425/450.1 |
| 5,833,899 A | 11/1998 | Wunderlich ................ 264/40.4 |
| 6,152,721 A | * 11/2000 | Schad et al. ................. 425/150 |

FOREIGN PATENT DOCUMENTS

| EP | 0393389 A3 | 3/1990 | ........... B29C/45/53 |
| EP | 0393389 A2 | 3/1990 | ........... B29C/45/53 |
| EP | 0393389 B1 | 3/1990 | ........... B29C/45/54 |

* cited by examiner

Primary Examiner—Jan H. Silbaugh
Assistant Examiner—Joseph S. Del Sole
(74) Attorney, Agent, or Firm—Katten Muchin Zavis Rosenman

(57) ABSTRACT

A shooting pot actuator for an injection molding machine having two plates carrying pusher rods for pushing against injection plungers within the shooting pots. The plates are mounted outside the mold and the clamp unit, and the pushers extend through bores in the stationary platen of the clamp unit to reach the injection plungers. The actuator reduces the cost and complication of mold design and production, and permits simplified adjustment of the injection plunger stroke.

15 Claims, 8 Drawing Sheets

SHOOTING POT ACTUATOR FOR AN INJECTION MOLDING MACHINE

This application is a continuation of U.S. application Ser. No. 09/050,095, filed Mar. 30, 1998, now U.S. Pat. No. 6,152,721.

FIELD OF THE INVENTION

The present invention relates to injection molding machines. More particularly, the present invention relates to the common control of multiple shooting pots in a injection molding machine.

BACKGROUND OF THE INVENTION

Employing control units, such as shooting pots, to introduce thermoplastic resins or other materials into a mold cavity in an injection molding machine is well known. Generally, a primary resin source feeds the material to a shooting pot reservoir which is, in turn, operated to feed a measured, or metered, quantity of the material into the mold cavity. U.S. Pat. No. 3,516,123, entitled "Injection Molding Machine", to Lang; and U.S. Pat. No. 3,231,656, entitled "Apparatus and Method of Plastic Molding", to Ninneman both disclose the use of shooting pots to provide accurately metered shots of resin to a mold cavity. Metering permits an accurate amount of material to be injected into a mold to ensure that a properly formed part is created and to prevent waste of material in the form of "flash", etc. due to overfilled molds. Metering is generally achieved by controlling the distance by which an injection plunger in the shooting pot is retracted and advanced for each shot.

Other metering techniques are also well known. For example, U.S. Pat. No. 4,966,545, entitled "Staged Shooting Pot for Injection Molding, to Brown, shows how a single shooting pot can be operated to cause two sequential metered injections of the same resin into the same mold cavity. U.S. Pat. No. 4,460,324, to Van Appledorn, entitled "Shot Cylinder Controller for Die Casting Machines and the Like", shows how the injection speed of the piston of shooting pot can be controlled, thereby controlling the rate of injection of the resin into the mold cavity.

It is also well known to supply thermoplastic material to a multicavity, mold through a hot runner system. The hot runner system can include a plurality of shooting pots, with at least one shooting pot associated with each mold cavity.

Hot runners systems can also be used for multimaterial injection, or coinjection, molding. Typically, two or more resins are injected, either simultaneously or sequentially, into each mold cavity to produce multi-layered molded structures. For example, a common application for multi-material molding is the production of food quality containers from recycled plastic. Government standards require that any surfaces which contact the food be made of new, virgin, plastic. To take advantage of lower cost recycled plastics, manufacturers use coinjection techniques to encapsulate recycled material in a sheath of new plastic. U.S. Pat. No. 5,098,274 to Krishnakumar, entitled "Apparatus for Injection Molding of Multilayer Preforms", and U.S. Pat. No. 4,717,324 to Schad, entitled "Coinjection of Hollow Articles and Preforms" both disclose injection molding machines for multimaterial applications.

Generally, individual control of the shooting pot strokes is provided in these prior art injection molding machines. Separate hydraulic actuation cylinders for each shooting pot injection plunger are mounted inside the machine's stationary platen. These hydraulic cylinders must be individually set for stroke to control the individual metering of the resins into the mold cavities. The setting of the cylinders can be a hazardous operation, which is performed manually and requires personnel to reach into the machine amongst the heated injection nozzles, close to hot surfaces and heated injection materials. Furthermore, the molding process has to be interrupted for this adjustment, which can cause significant loss of production time, especially in larger machines having up to ninety six injection plungers.

U.S. Pat. No. 4,632,653 to Plocher, entitled "Press with a Plurality of Injection Plungers" describes a common actuator for the injection plungers in a transfer molding machine. The injection plungers are actuated by a hydraulic drive acting on a single crosspiece. However, the shooting pot actuator disclosed in Plocher has several limitations and disadvantages which make it inapplicable to metered injection molding machines. Firstly, the shooting pots in a compression molding machine do not provide metered shots. Instead, each shooting pot is filled with an approximate amount of resin and the injection pistons are actuated by the crosspiece to compress the resin into the mold cavity. Plocher discloses pressure compensating pistons and overflow channels to relieve the mold cavities in the case of overfilling, which results in non-uniform product and flashing. Also, there is no mechanism provided for adjusting the stroke of the injection pistons since precise control of the amount of resin injected into the mold is not critical in such a transfer molding process. Second, the crosspiece actuator in Plocher is located within the mold, which increases the cost of designing and manufacturing the mold. Also, such a design is impractical in machines with high clamp forces as the volume occupied by the crosspiece reduces the strength of the mold component in which it is located, thus increasing the likelihood of deformation of mold components when clamped. Further, the mold must be completely disassembled to obtain access for maintenance, adjustment, or replacement.

SUMMARY OF THE INVENTION

It is an object of the present invention to provide a novel shooting pot actuator for a multicavity injection molding machine which obviates or mitigates at least one of the disadvantages of the prior art.

In a first embodiment of the present invention, there is provided an injection molding machine comprising:

a clamp unit for clamping a mold having at least two shooting pots each having an injection plunger, said clamp unit including a stationary platen and a movable platen disposed on opposing sides of said mold;

an injection unit to provide to said shooting pots material to be injected;

a shooting pot actuator, exterior to said clamping unit and extending through one of said platens; and a drive means operable to move said actuator between a first position and a second position, wherein in said first position said injection plungers limit the volume of material which each said shooting pot can receive from said injection unit, and wherein said material is expressed from said shooting pots as said actuator is moved to said second position.

In a further aspect of the present invention there is provided a multimaterial injection molding machine comprising:

a mold having at least two mold cavities, each of said at least two mold cavity having at least a first and a second shooting pot communicating therewith, said first and second shooting pots having respective first and second injection plungers;

a clamp unit including a stationary platen and a movable platen disposed on opposing sides of said mold;

an injection unit to provide to said shooting pots material to be injected;

a shooting pot actuator, exterior to said clamping unit and extending through one of said platens; said actuator having a first group of pushers for abutting said first injection plungers, and a second group of pushers for abutting said second injection plungers; and a drive means operable to move said first and second groups of pushers between a first position and a second position, wherein in said first position said injection plungers limit the volume of material which each said shooting pot can receive from said injection unit, and wherein said material is expressed from said shooting pots as said actuator is moved to said second position.

In another aspect of the present invention, there is provided a shooting pot actuation assembly for an injection molding machine having a clamp unit for clamping a mold having at least two shooting pots each having an injection plunger, said clamp unit including a stationary platen and a movable platen disposed on opposing sides of said mold, and an injection unit to provide to said shooting pots material to be injected, comprising:

a frame securable to an exterior of one of said platens and having a portion spaced from said platen;

a shooting pot actuator, supported for linear movement within said frame, for extension through said platen to abut said injection plungers; and a drive mounted on said portion, said drive means being operable to move said actuator between a first position and a second position, wherein said first position determines the volume of material which each said shooting pot can receive from said injection unit, and wherein said volume is expressed from said shooting pots as said actuator is moved to said second position.

In a further embodiment of the present invention, there is provided a shooting pot actuator for a multimaterial injection molding machine having a clamp unit including a stationary platen and a movable platen disposed on opposing sides of a mold having at least two mold cavities and at least first and second shooting pots for each said mold cavity, said shooting pots having corresponding first and second injection plungers, and an injection unit to provide to said shooting pots material to be injected, comprising:

at least two first pushers, each said first pusher operable to abut a respective first injection plunger; and at least two second pushers through which said first pushers extend, each said second pusher operable to abut a respective second injection plunger;

said first and second pushers operable to move independently between a first and second position wherein said first position determines the volume of material which each respective shooting pot can receive from said injection unit, and wherein said volume is expressed from said shooting pots as said pushers are moved to said second position.

BRIEF DESCRIPTION OF THE DRAWINGS

Preferred embodiments of the present invention will now be described, by way of example only, with reference to the attached Figures, wherein.

DETAILED DESCRIPTION

Figure 1:
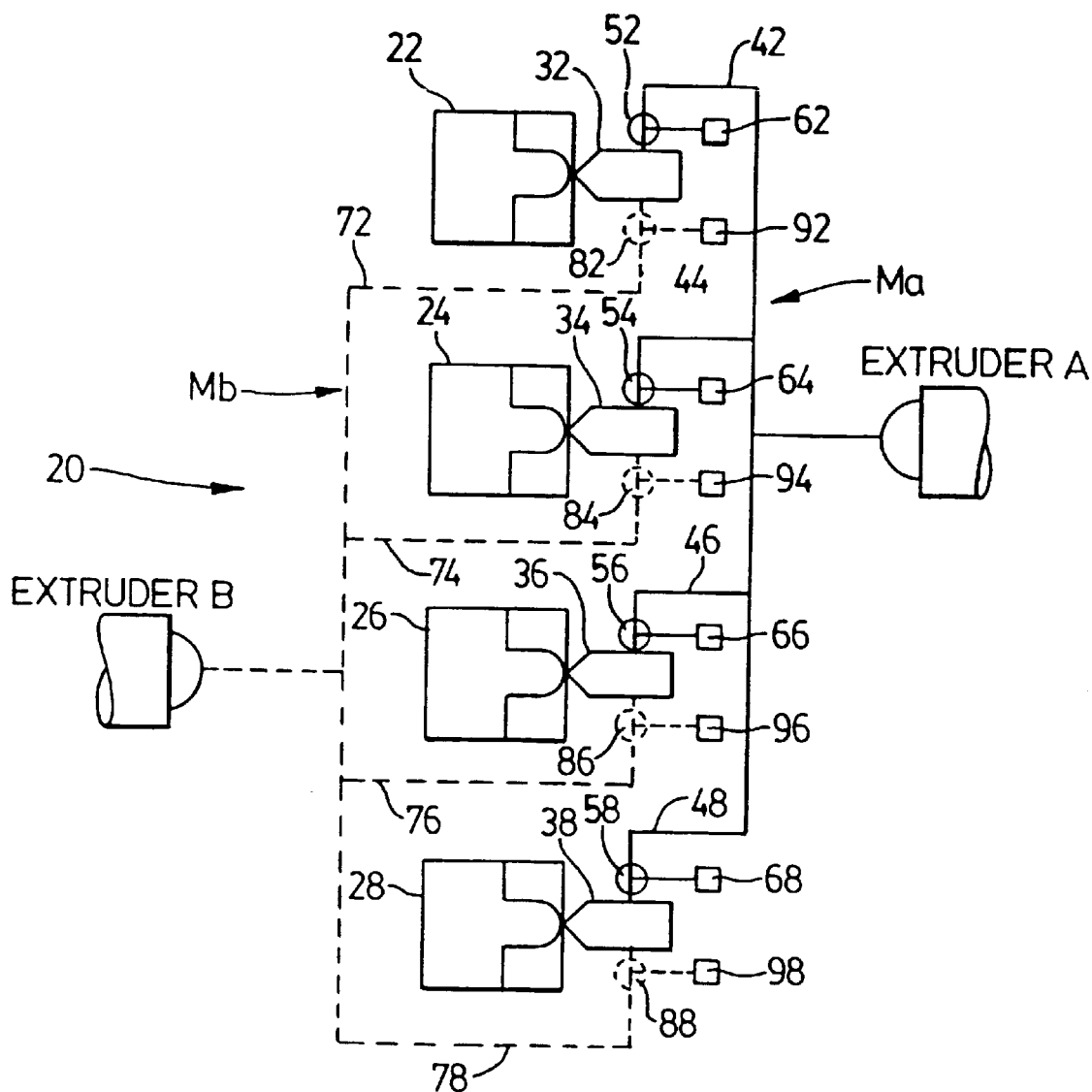
FIG. 1 is a schematic illustration of a multimaterial hot runner system for a four cavity mold.

For purposes of illustration, the present invention will be described with reference to a dual hot runner injection molding machine as shown in the drawings. As will be apparent to those skilled in the art, the present invention can be generally employed in any injection molding machines having multiple shooting pots for which common control is desired.

Figure 2:
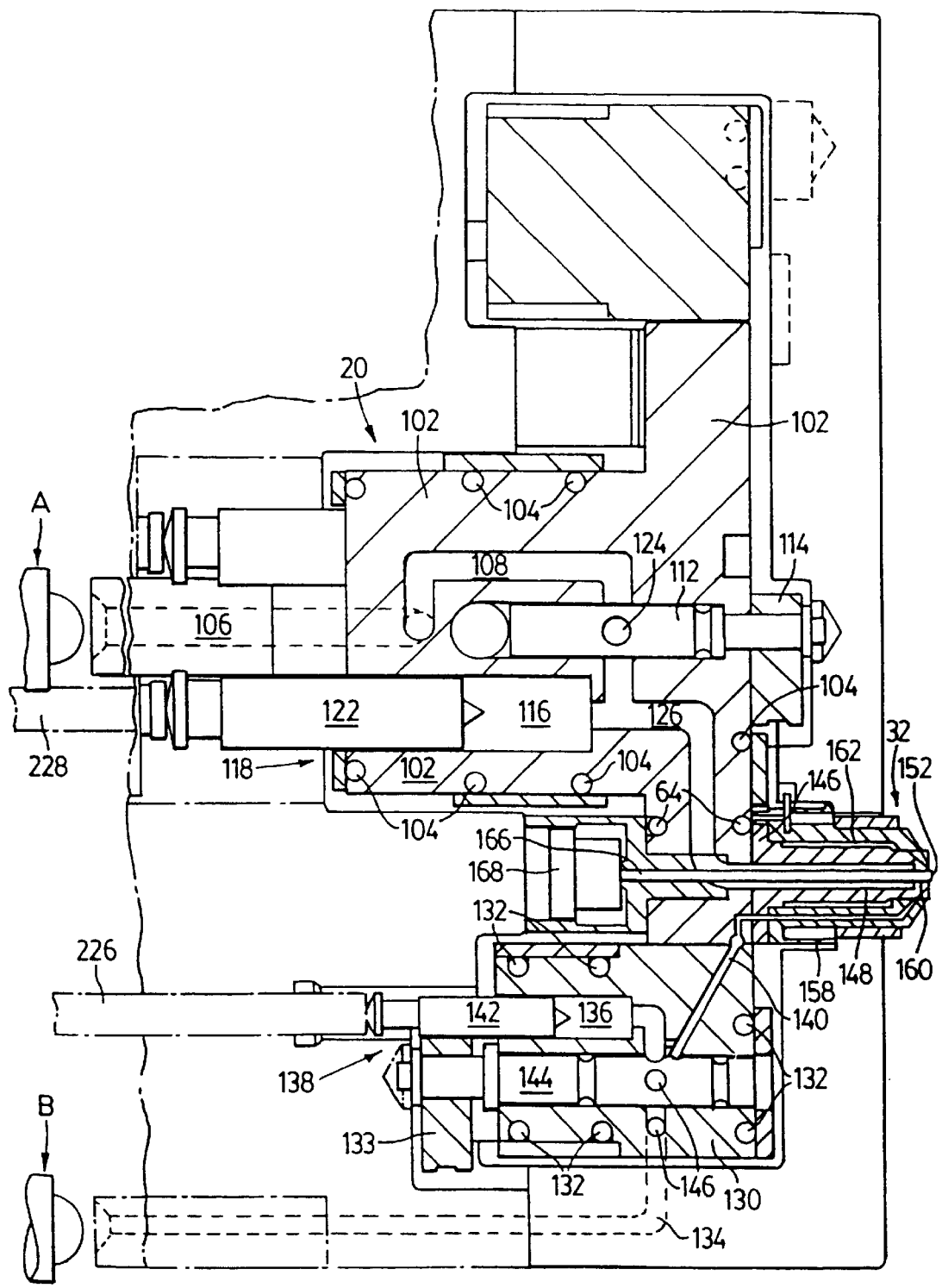
FIG. 2 shows a cross section of a multimaterial hot runner system in the vicinity of one nozzle assembly.

An embodiment of the present invention is shown in FIGS. 1 and 2, wherein FIG. 1 shows a shows a schematic and FIG. 2 shows a cross section of a portion of a hot runner system for an injection molding machine which accommodates two thermoplastic resins, or other material to be molded, indicated generally at reference numeral 20. One resin is provided from a source identified as Extruder A, the other resin is provided form a source identified as Extruder B. While the illustrated embodiment shows two resin sources A and B, it is entirely within the scope of the invention to utilize one, two or more sources. The portion of the hot runner system 20 leading from Extruder A is shown in solid lines, and the portion of the system leading from Extruder B is shown in dashed lines.

As shown in FIG. 1, the materials supplied by Extruders A and B are fed to mold cavities 22, 24, 26 and 28 through corresponding individual coinjection nozzles 32, 34, 36 and 38. Extruder A supplies a heated manifold $M_a$ which, in turn, communicates with each nozzle 32, 34, 36 and 38 via hot runners or channels 42, 44, 46 and 48, respectively. Rotary valves 52, 54, 56 and 58 operate to control charging of shooting pots, or injection cylinders, 62, 64, 66 and 68.

Correspondingly, heated manifold $M_b$ leads from Extruder B to each nozzle 32, 34, 36 and 38 via hot runners 72, 74, 76 and 78. Rotary valves 82, 84. 86 and 88 control charging of shooting pots 92, 94, 96 and 98.

While the schematic of FIG. 1 shows a hot runner system 20 leading from two sources, Extruders A and B, transporting conditioned thermoplastic resins to a four cavity mold, it is entirely within the scope of the present invention to service forty-eight, or more, mold cavities originating from one, two or more sources.

As shown in FIG. 2, a central manifold block 102 is maintained at an appropriate temperature range by heating elements 104. For example, if the resin is polyethylene terephthalate (PET), the central manifold block can be maintained at a temperature ranging from approximately 500° to 550° F. Channels 106 and 108 receive plasticized resin from Extruder A. Rotary valve 112, in circuit with channel 108 and operated by link mechanism 114, controls the charging of reservoir 116 of shooting pot, or injection cylinder, 118 each of which is equipped with an injection plunger 122. Rotary valve 112 is formed with a transverse throughbore 124 and is shown in FIG. 2 in the closed position. The reservoir 116 communicates with channel 126 which, in turn, leads to the nozzle assembly 32. Nozzle assembly 32 functions to inject the resin into a mold cavity (not shown).

Similarly, for the path leading from Extruder B, a manifold block 130, which can be a separate segment from manifold 102 or a part thereof, is maintained at an appropriate temperature range by heating elements 132. For example, if the resin is ethylene vinyl alcohol copolymer (EVOH), the central manifold block can be maintained at a temperature ranging from approximately 400° to 440° F. by heaters 132. Channels 134 receives plasticized resin from Extruder B. Rotary valve 144, in circuit with channel 134 and operated by link mechanism 133, controls the charging of reservoir 136 of shooting pot, or injection cylinder, 138 each of which is equipped with an injection plunger 142. Rotary valve 144 is formed with a transverse throughbore 146 and is shown in FIG. 2 in the closed position. The reservoir 136 communicates with channel 140 which, in turn, leads to the nozzle assembly 32.

Nozzle assembly 32 includes a central spigot 146 in thermal contact with manifold block 102. Spigot 146 is formed with a through channel 148 through which the resin can flow to a nozzle gate 152. As shown, a valve stem 166 moved by a piston controls the opening and closing of gate 152. Other gating systems, as are well known to those of skill in the art can be used to control the injection of resin through nozzle assembly 32.

Spigot 146 is supported in a housing 158 which is spaced from spigot 146 substantially through its length by an insulating air gap 162 to maintain the resin from Extruder B at its optimum processing temperature as it progresses to gate 152 through a channel 160.

Generally, to inject the two resins from Extruders A and B into each mold cavity, the set of injection plungers 122 for the resin supplied by Extruder A is first advanced to displace a metered amount of the first resin into the mold cavity, partially filling it. This is followed by advancing injection plunger 142 to displace a metered amount of the second resin supplied by Extruder B, again only partially filling the mold cavity. Finally, a second feeding of the first resin directly through channel 126, bypassing shooting pot, fills the mold cavity and packs out the molded articles. As is well understood, the particular sequence chosen for producing the molded articles will depend on the desired final structure, and can include simultaneous, as well as sequential, injection into the mold cavity.

Figure 3:
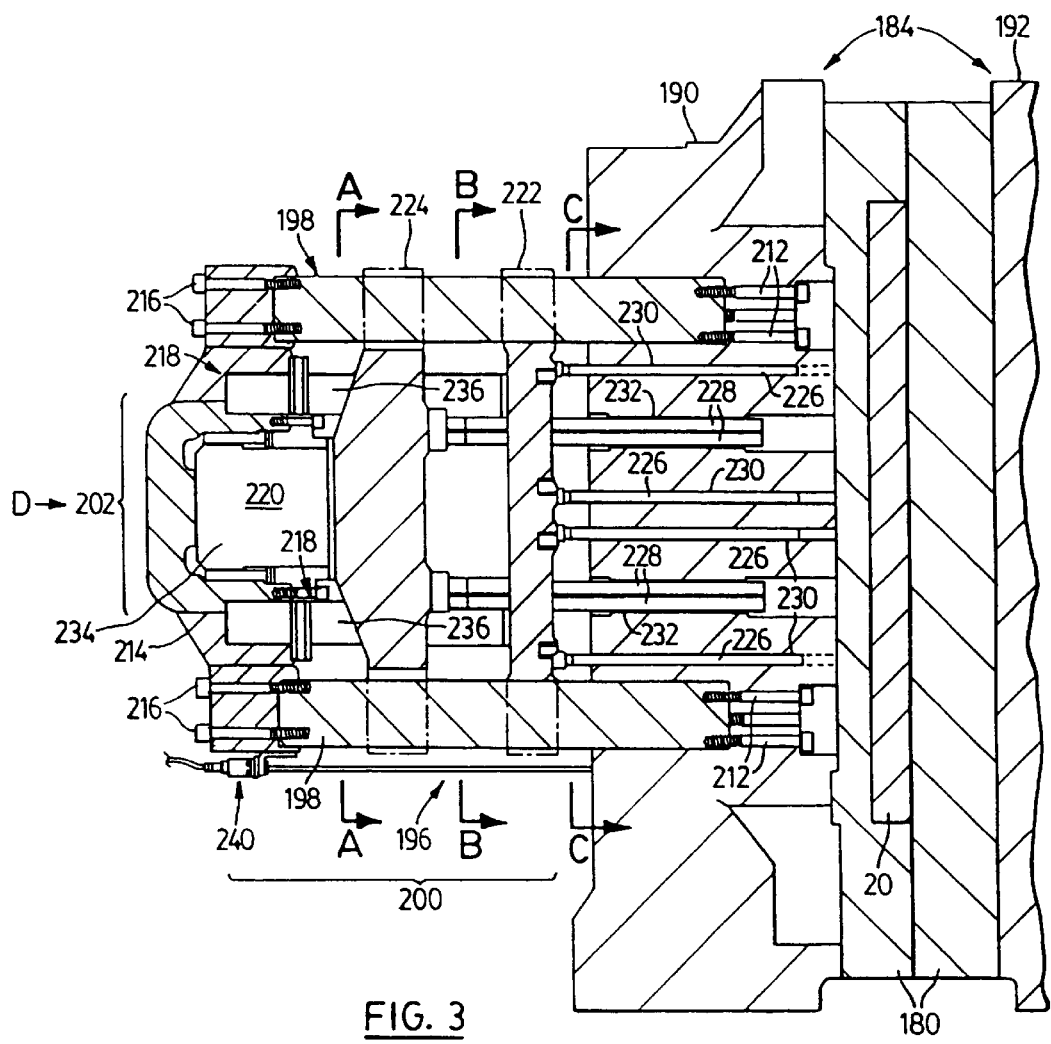
FIG. 3 shows a cross section of a portion multimaterial injection molding machine, including a common shooting pot actuation assembly with all pushers in the retracted position.
Figure 4:
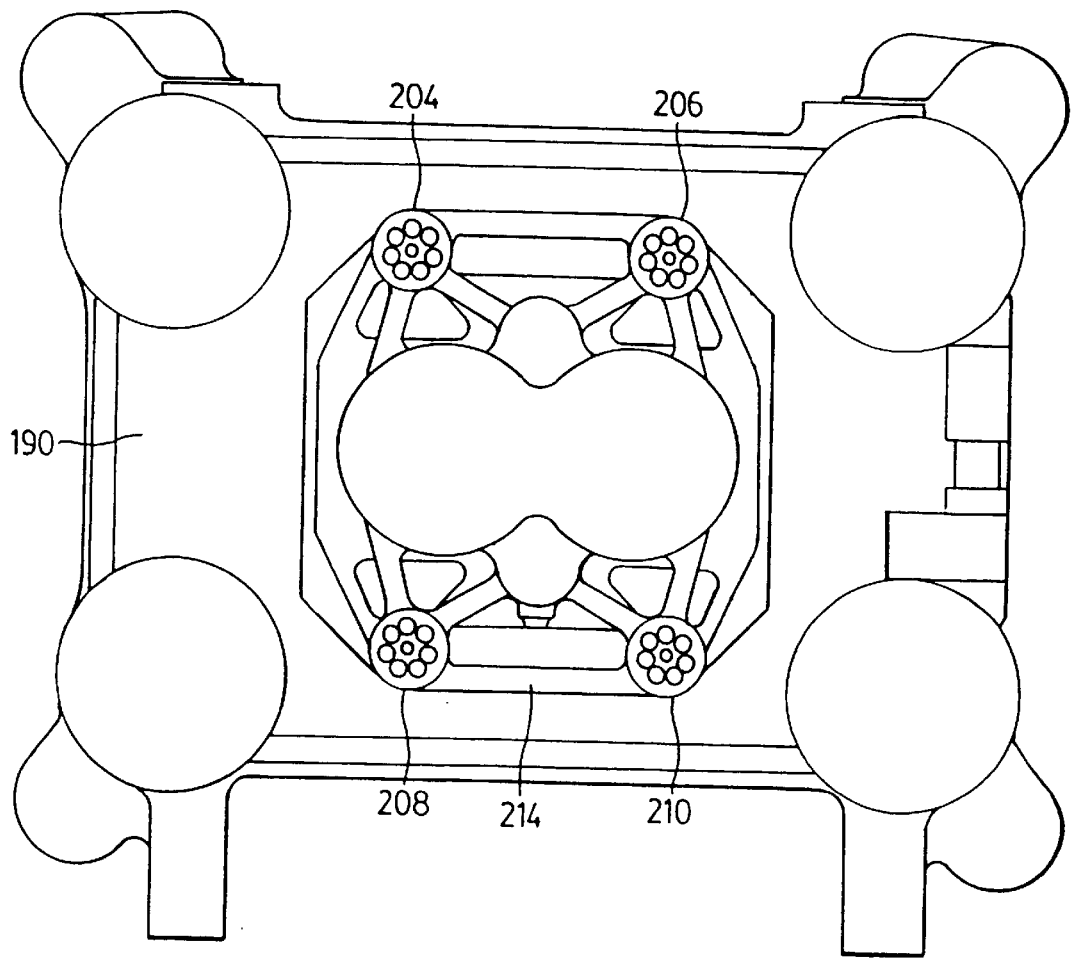
FIG. 4 shows a rear view of the machine of FIG. 3 in the direction of the line D.

FIGS. 3–9 show side and rear views of an injection molding machine incorporating an embodiment of the present invention. In FIG. 3, a mold 180, including hot runner system 20, is mounted between a clamp unit 184. Clamp unit 184 generally comprises a stationary platen 190 and a movable platen 192. Mounted to the exterior of the stationary platen 190 is a common shooting pot actuation assembly 196. While in the illustrated embodiment, and the following description of the present invention, the shooting pot actuation assembly 196 is mounted to the stationary platen 190, it is fully within the contemplation of the inventors that assembly 196 can be mounted to whichever platen is adjacent hot runner 20.

Shooting pot actuation assembly 196 generally comprises a frame 198, a shooting pot actuator 200, and drive means 202. Frame 198 has four columns 204, 206, 208 and 210 secured to stationary platen 190 in a generally rectilinear pattern by bolts 212, as shown in FIG. 3. A drive support 214, spaced from the rear of the stationary platen 190 by the exposed length of columns 204, 206, 208 and 210 is mounted to the ends of the columns and secured by bolts 216. To drive support 214 are attached first and second drives 218 and 220, the operation of which will be further described below. Drives 218 and 220 can be hydraulic rams, linear electric motors, or any other suitable drive.

Shooting pot actuator 200 is mounted on columns 204, 206, 208 and 210 for sliding movement between drive support 214 and the rear of stationary platen 190. In the illustrated embodiment, actuator 200 has two parallel and separately movable plates 222 and 224. A first group of pushers 226 is secured to first plate 222. Pushers 226 are arranged to correspond to the position of each of the injection plungers 142 in their respective set in mold 180. Similarly, a second group of pushers 228 are secured to second plate 224, and are arranged to correspond to the position of injection plungers 122 in their respective set. Pushers 226 and 228 can be screwed into plates 222 and 224, or can be secured with "bayonet" mounts, or in any other appropriate manner. Ideally, the mounting method ensures that each mounted pusher 226, 228 extends from its respective plate 222, 224 to a substantially identical extent.

Figure 7:
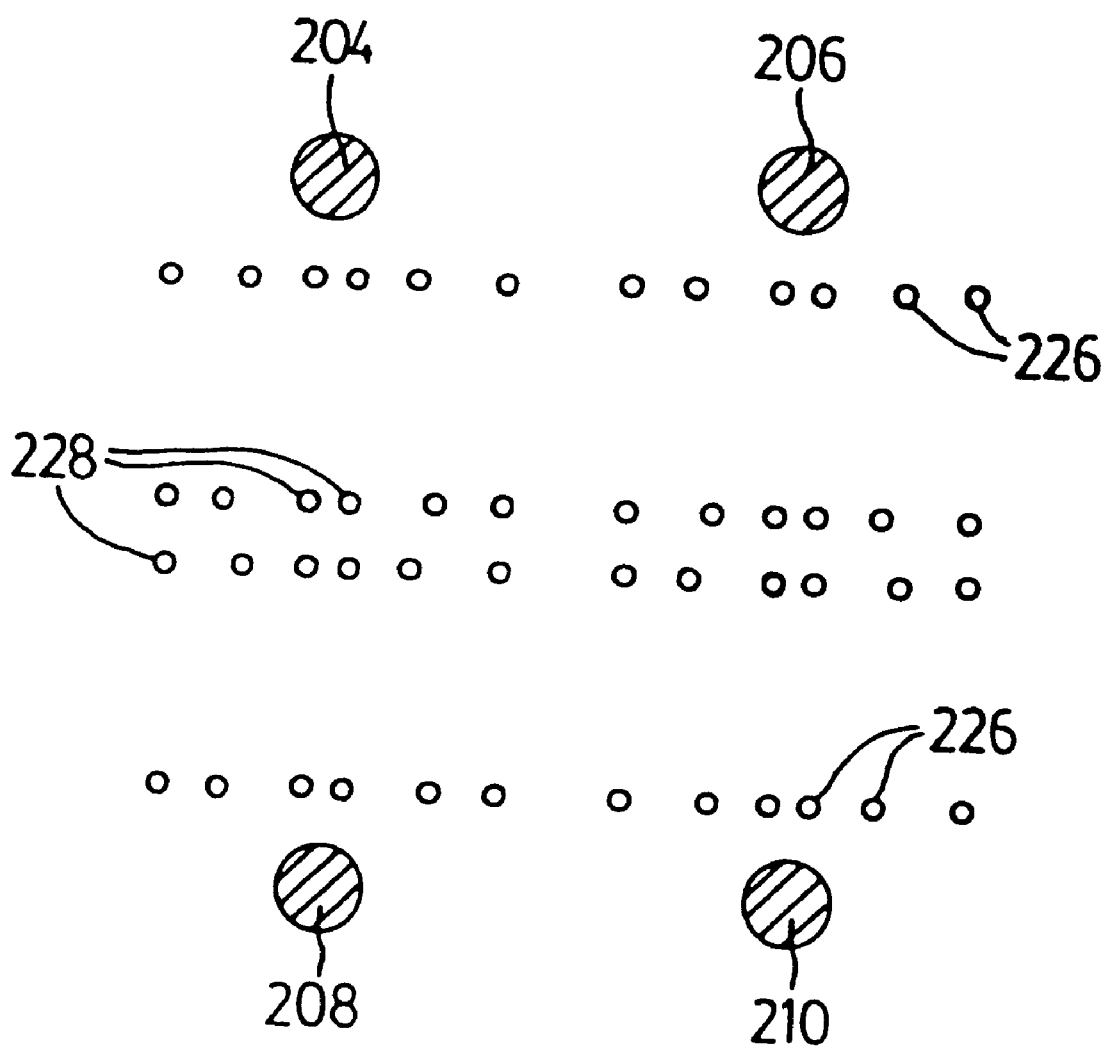
FIG. 7 shows a cross section of the machine of FIG. 3 along the line C—C.

Pushers 226 and 228 extend through bores 230 and 232, respectively, in stationary platen 190 and abut injection pistons 142 and 122. The arrangement of pushers 226 and 228 depends upon the placement of shooting pots 138 and 118, and their respective injection plungers 142 and 122, in the hot runner system 20. FIG. 7 shows an arrangement suitable for a forty-eight mold cavity coinjection molding machine for making preforms. To accommodate a number of different shooting pot arrangements, pushers 226 and 228 can be detached and rearranged as desired on plates 222 and 224, or separate plate-pusher assemblies can be provided for different molds 180. It is contemplated that standardized injection plunger spacings can be employed to permit molds to be interchangeable, as described below in more detail.

Figure 5:
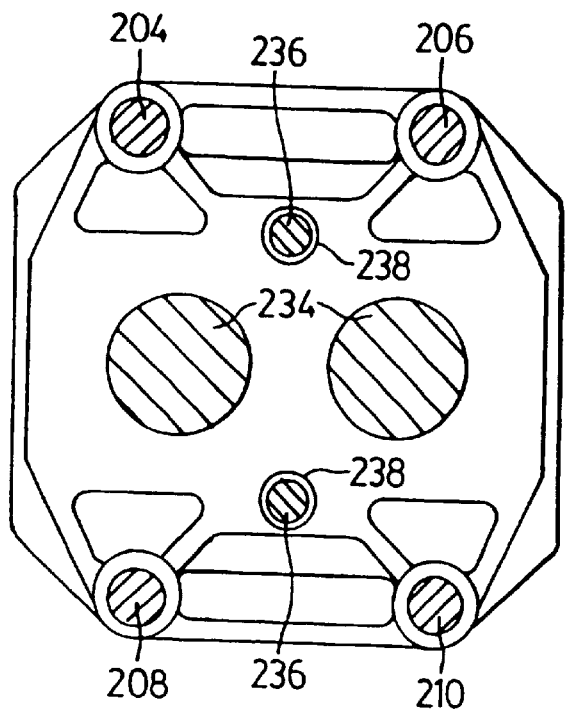
FIG. 5 shows a cross section of the machine of FIG. 3 along the line A—A.
Figure 6:
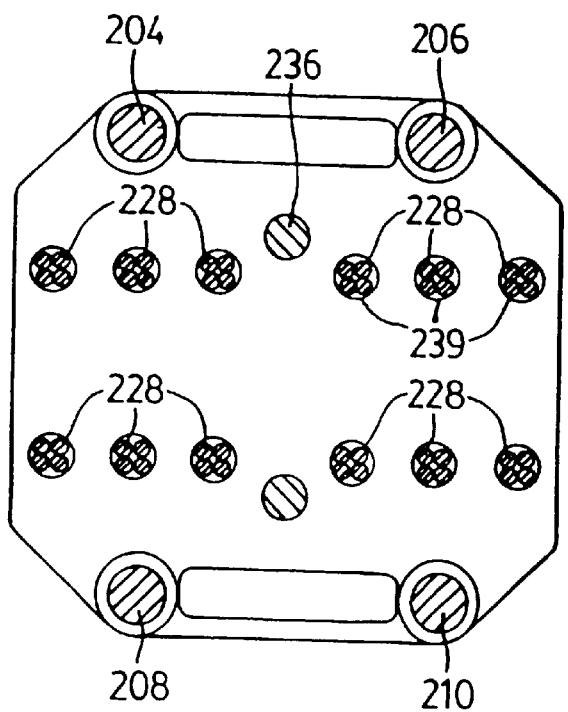
FIG. 6 shows a cross section of the machine of FIG. 3 along the line B—B.

Plate 222 can be driven reciprocally along columns 204, 206, 208 and 210 by corresponding drive 218. As best seen in FIGS. 5 and 6, drive 218 comprises two hydraulic cylinder pistons 236. Plate 224 is similarly driven by drive 220 which comprises two hydraulic cylinder pistons 234. Since plate 222 is disposed in front of plate 224, piston bores 238 are provided in plate 224 to accommodate the passage of pistons 236 and to permit free movement of plate 222 with respect to plate 224. Similarly, bores 239 are provided in plate 222 to permit the free passage of pushers 228 therethrough. Depending on the configuration of pistons 236, bores 238 and 239 can be replaced by cutouts, or omitted altogether if the pushers would not interfere.

The position and linear velocity of plates 222 and 224 can be sensed by linear position sensor means 240. Sensor 240 can be a magnetic, opto-electronic or other suitable sensor, such as those manufactured by Temposonic Inc. Sensor 240 is fixed to frame 198, or otherwise fixed relative to plates 222 and 224. The sensor 240 can be attached to a suitable control system (not shown) for conventional electronic and/or programmable control of the actuator 200, as is well known to those of skill in the art.

Figure 8:
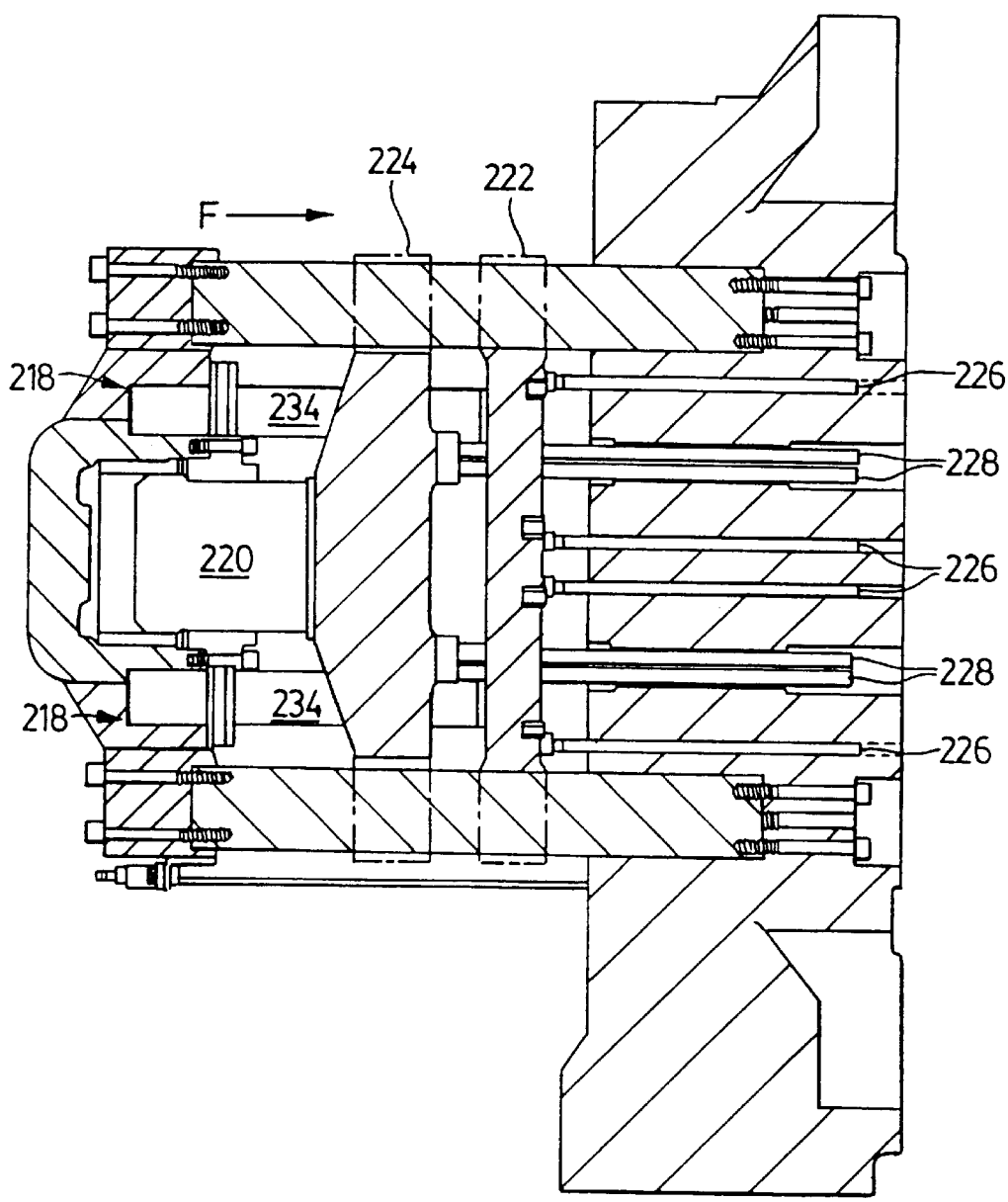
FIG. 8 shows the machine of FIG. 3 with the first set of pushers advanced.
Figure 9:
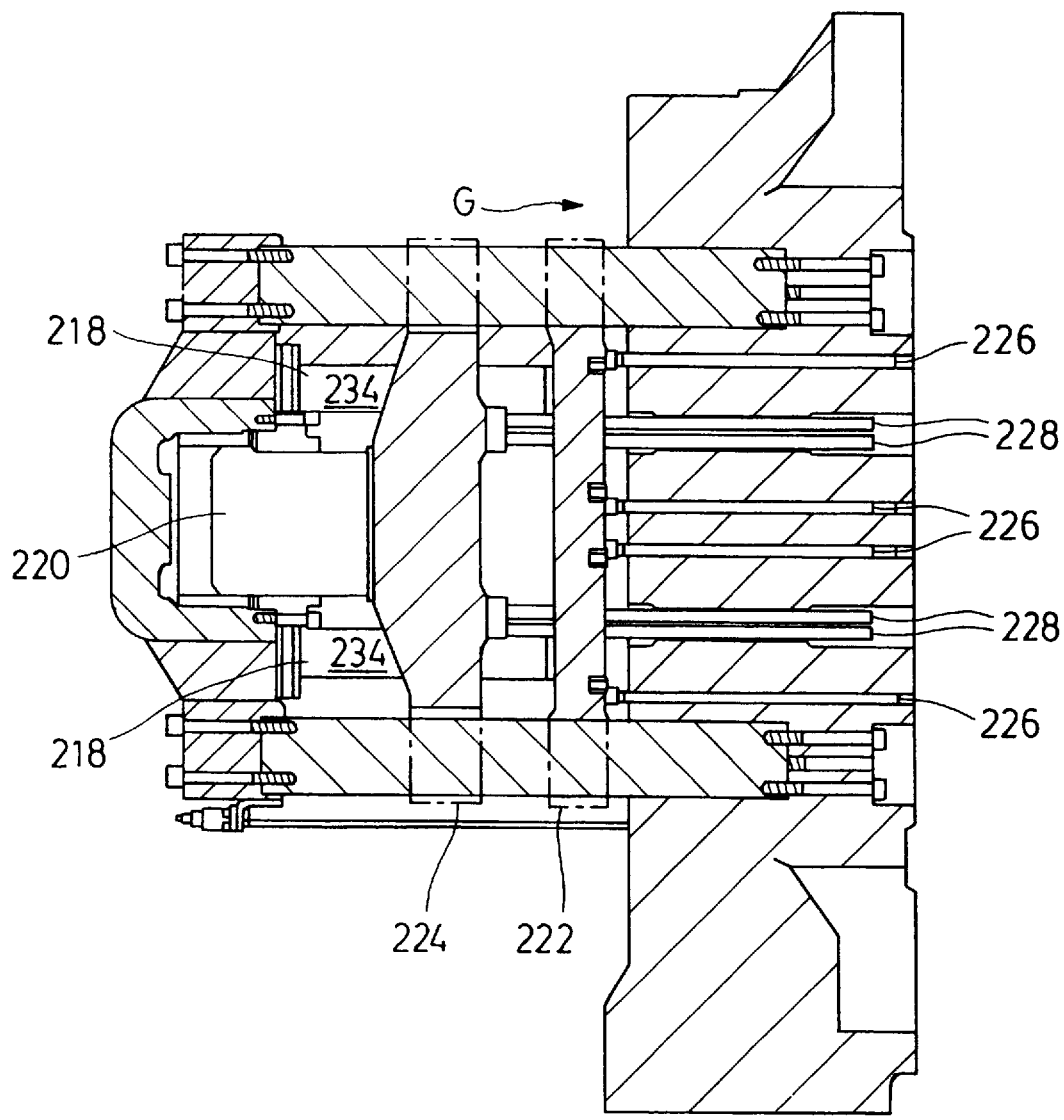
FIG. 9 shows the machine of FIG. 3 with both the first and second sets of pushers advanced.

Referring to FIGS. 3, 8 and 9, the operation of the actuator 200 will be described with respect to a multimaterial injection sequence. Prior to the below described injection sequence, the clamp unit 184 is activated to clamp together the mold 180, in a manner well understood by those of skill in the art. The injection sequence begins with pushers 226 and 228, and plates 222 and 224, in a retracted position, as shown in FIG. 3. In the retracted position, the free ends of the pushers 226 and 228, which abut the injection pistons 142 and 122 in the hot runner system 20, limit the rearward movement of the injection pistons 142 and 122, and, hence the volume of material that can be received in shooting pot reservoirs 136 and 116. Adjusting the retracted positions of plates 222 and 224, by adjusting the rearward stroke of their respective cylinder pistons 234 and 236, thereby effectively meters the amount of material that can be accepted by each shooting pot reservoirs 136 and 116 from Extruders B and A.

Once the shooting pot reservoirs 136 and 116 are filled with the desired amount of material in the manner described above, plate 224 and its pushers 228 are advanced to actuate the set of injection pistons 122, thereby injecting the metered shot of material from each reservoir 116 into its respective mold cavity. Pushers 228 are advanced by a forward stroke of cylinder pistons 234 acting upon plate 224 in the direction of the arrow F, as shown in FIG. 8. Bores 238 and 239 permit plate 224 to move forward without affecting the position of plate 222. The position and speed of plate 224 during the forward stroke is sensed by sensor 240. Sensor 240 relays the information to the control system which in turn, controls the speed and distance traveled by the pushers 228.

Next, as shown in FIG. 9, plate 222 and its pushers 226 are advanced to actuate injection plungers 142, thereby injecting the metered shot of material from each reservoir 136 into its respective mold cavity. Pushers 226 are advanced by a forward stroke of cylinder pistons 236 acting upon plate 222 in the direction of the arrow G. The position and speed of plate 222 are sensed by sensor 240 to control The speed and distance travelled by the pushers 226, as described above. An injection of material from Extruder A is then fed directly to the nozzle 32 to pack the mold, and the gate 152 is closed.

The coinjection molding operation then proceeds as in conventional machines. The material injected into the mold cavities is permitted to cool, the clamp unit 184 is released, and the finished product is ejected from the mold.

As will be apparent to those skilled in the art, the present invention not limited to two plates, but can be extended to three or more plates-pushers and corresponding sets of shooting pots, as desired. Nor is the actuator of the present invention limited to sequential injection of the multiple resins. Combinations of sequential and/or simultaneous movement of the push rods are possible to cause like injections of the respective resins.

The actuator assembly 196 of the present invention can also be incorporated into a transfer injection molding system, such as described in commonly owned U.S. application Ser. No. 90/267,341, filed Mar. 19, 1998. As described therein, the injection plungers are pulled backwards from their forward stroke position at the same rate as the shooting pots are being filled to reduce the acetaldehyde content of the finished articles. In this case, to incorporate the actuator assembly 196, The pusher rods 226, 228 are fixed to the injection plungers to permit the controlled retraction of the injection pistons, and a control system monitors and controls the rate at which the plungers are pulled backwards.

The provision of a single actuation assembly 196 for a plurality of shooting pots, exterior to the mold 180 and clamp unit 194 has clear advantages over the prior art. The actuation of a group of shooting pots in a mold can be effected by a single adjustment to the speed and distance travelled by its related plate and respective pushers. This adjustment can be accomplished "on the fly" and/or can be automatically controlled by the control system in response to the information detected by the linear position sensor. This eliminates hazardous, individual manual adjustments, and lengthy interruptions and delays in production while ensuring the supply of accurately metered materials. The stroke of each plate, and the arrangement of the pushers on each plate can also be independenly adjusted.

The fact that the actuator is outside the mold can reduce the cost of constructing an injection molding machine by providing a much simpler structure and reducing the number of costly hydraulic components and circuitry required for individual shooting pot actuation. For example, the significant reduction in numbers of hydraulic cylinders and valving from ninety-six in a typical forty-eight cavity coinjection molding machine, to just four cylinders and their corresponding valving can result in significant cost reductions. The cost of operation and maintenance can also be reduced because of simpler construction. In particular, hydraulic cylinders and piping within the stationary platen can be eliminated, fewer, more robust cylinders can be employed, and access to the cylinders for maintenance and adjustment is simplified.

The present invention also provides increased design flexibility to the designers of molds and production lines. Extra plates can be easily added to the actuator to handle additional resin injections. Also relocating pusher rods to match different shooting pot arrangements is easy to facilitate. Drilling a different bore pattern in the plates and stationary platen is much less costly than having to relocate the multiple actuation cylinders within the stationary platen of the prior art. The design of molds is also greatly simplified by eliminating the need for multiple cylinders within the stationary platen, and the cost of the molds is therefore reduced.

The ability to add/detach pushers and rearrange them on their respective plates can also reduce the time and cost associated with re-tooling an injection molding machine. Generally, the detachable nature of the pushers permits new pusher arrangements to be easily effected for any given mold design. Pushers of different lengths, shapes and sizes can interchanged on the same plate, as is appropriate for each particular mold design. It is contemplated that molds can be designed with standardized shooting pot spacings. For example, if a mold having twenty-four mold cavities at eight inch spacings is to be replaced by a mold having twelve cavities at sixteen inch spacings, every second pusher can be removed to arrive at the appropriate arrangement.

The actuator of the present invention can also greatly reduce the time required to set, or reprogram, the stroke cycle for a particular mold or product. The cycle only has to be set for each set of like shooting pots, not for each separate shooting pot. Information relating to the stroke control for a particular mold can be stored, by electronic or other means, which allows the rapid changing of molds. This can be especially useful for "short run" molds.

Locating the actuator outside the mold also permits shooting pots in the hot runner to be repositioned to optimize resin flow channels and shorten flow lengths. Prior art actuators imposed limitations on the shooting pot layout by virtue of the space required in the stationary platen to accommodate the hydraulic actuation cylinders and their associating valving and plumbing. By removing this limitation more efficient hot runner designs are possible and resin management can be optimized, thereby reducing the resin inventory within a machine.

The above-described embodiments of the invention are intended to be examples of the present invention and alterations and modifications may be effected thereto, by those of skill in the art, without departing from the scope of the invention which is defined solely by the claims appended hereto.

We claim:

1. An injection molding machine comprising:
   a mold having a mold cavity, said mold cavity having two shooting pots for charging an injectable material into the mold cavity, each said shooting pot having an injection plunger for expressing said material from said shooting pot into said mold cavitys;
   a clamp unit for clamping the mold, said clamp unit including a stationary platen and movable platen disposed on opposite sides of said mold;
   an injection unit for supplying said material to said shooting pots, said injection unit fluidly communicating with said mold cavity through said shooting pots;
   a shooting pot actuator, disposed exterior to said clamping unit, said shooting pot actuator comprising a pusher for each shooting pot, each of the pushers extending through one of the platens, each pusher having (i) a retracted position limiting rearward movement of said injection plunger as said each shooting pot is charged, and (ii) movable To a second position to advance said injection plunger and express a metered amount of material from said each shooting pot;
   a linear position sensor operably attached to a control system, for sensing each said actuator; and
   a drive means responsive to said control system and operable to separately move the pushers between said retracted and second positions.

2. An injection molding machine according to claim 1, wherein each shooting pot actuator includes at least two pushers each operable to abut a respective injection plunger.

3. An injection molding machine according to claim 1, wherein said drive means comprises a hydraulic ram.

4. An injection molding machine according to claim 1, wherein said linear position sensor comprises an optical sensor.

5. An injection molding machine according to claim 1, wherein each pusher is movable to a third position intermediate to said retracted and second positions.

6. An injection molding machine according to claim 1, wherein said injection molding machine includes at least four shooting pots grouped in at least first and second sets of at least two shooting pots each, and wherein said actuator includes corresponding first and second groups of pushers for each said set and said drive means is operable to independently move each group between said retracted and second positions.

7. An injection molding machine according to claim 6, wherein said first and a second groups are connected to respective first and second supports, and wherein said first group extends through said second support.

8. An injection molding machine according to claim 7, wherein said supports comprise planar plates.

9. An injection molding machine according to claim 7, wherein said pushers are disconnectable from said supports.

10. An injection molding machine according to claim 6, wherein said pushers are disposed symmetrically.

11. An injection molding machine according to claim 6, wherein said pushers in each group are equally spaced.

12. An injection molding machine according to claim 6, wherein said first and second sets of at least two shooting pots receive different materials.

13. An injection molding machine comprising:
   a mold having a mold cavity, said mold cavity having two shooting pots for charging an injectable material into the mold cavity, each said shooting pot having an injection plunger for expressing said material from said shooting pot into said mold cavity;
   a clamp unit for clamping the mold, said clamp unit including a stationary platen and movable platen disposed on opposite sides of said mold;
   an injection unit for supplying said material to said shooting pots, said injection unit fluidly communicating with said mold cavity through said shooting pots;
   a shooting pot actuator, disposed exterior to said clamping unit, said shooting pot actuator comprising a pusher for each shooting pot, each of the pushers extending through one of the platens, each pusher having (i) a retracted position limiting rearward movement of said injection plunger as said each shooting pot is charged, and (ii) movable to a second position to advance said injection plunger and express a metered amount of material from said each shooting pot;
   a linear position sensor operably attached to a control system, for sensing each said actuator; and
   a drive means responsive to said control system and operable to separately move the pushers between said retracted and second positions,
   wherein said linear position sensor is operably connected to said drive means.

14. An injection molding machine comprising:
   a mold having a mold cavity, said mold cavity having two shooting pots for charging an injectable material into the mold cavity, each said shooting pot having an injection plunger for expressing said material from said shooting pot into said mold cavity;
   a clamp unit for clamping the mold said clamp unit including a stationary platen and movable platen disposed on opposite sides of said mold;
   an injection unit for supplying said material to said shooting pots, said injection unit fluidly communicating with said mold cavity through said shooting pots;
   a shooting pot actuator, disposed exterior to said clamping unit, said shooting pot actuator comprising a pusher for each shooting pot, each of the pushers extending through one of the platens, each pusher having (i) a retracted position limiting rearward movement of said injection plunger as said each shooting pot is charged, and (ii) movable to a second position to advance said injection plunger and express a metered amount of material from said each shooting pot;
   a linear position sensor operably attached to a control system, for sensing each said actuator; and
   a drive means responsive to said control system and operable to separately move the pushers between said retracted and second positions,
   wherein said actuator comprises a plate, and wherein said linear sensor detects the position of said plate.

15. An injection molding machine comprising:
   a mold having a mold cavity, said mold cavity having two shooting pots for charging an injectable material into the mold cavity, each said shooting pot having an injection plunger for expressing said material from said shooting pot into said mold cavity;

a clamp unit for clamping the mold, said clamp unit including a stationary platen and movable platen disposed on opposite sides of said mold;

an injection unit for supplying said material to said shooting pots, said injection unit fluidly communicating with said mold cavity through said shooting pots;

a shooting pot actuator, disposed exterior to said clamping unit, said shooting pot actuator comprising a pusher for each shooting pot, each of the pushers extending through one of the platens, each pusher having (i) a retracted position limiting rearward movement of said injection plunger as said each shooting pot is charged, and (ii) movable to a second position to advance said injection plunger and express a metered amount of material from said each shooting pot;

a linear position sensor operably attached to a control system for sensing each said actuator; and a drive means responsive to said control system and operable to separately move the pusher between said retracted and second positions, wherein said retracted position is adjustable.

* * * * *